(12) United States Patent
Armstrong

(10) Patent No.: US 6,922,373 B2
(45) Date of Patent: Jul. 26, 2005

(54) METHOD OF ESTIMATING RELATIVE BEARING OF A BOREHOLE RECEIVER

(75) Inventor: Philip Neville Armstrong, Yokohama (JP)

(73) Assignee: Schlumberger Technology Corporation, Sugar Land, TX (US)

(*) Notice: Subject to any disclaimer, the term of this patent is extended or adjusted under 35 U.S.C. 154(b) by 275 days.

(21) Appl. No.: 10/243,313

(22) Filed: Sep. 14, 2002

(65) Prior Publication Data

US 2004/0052159 A1 Mar. 18, 2004

(51) Int. Cl.$^7$ ................................................. G01V 1/48
(52) U.S. Cl. ............................. 367/73; 367/25; 367/57
(58) Field of Search .............................. 367/16, 33, 57, 367/58, 75, 25; 33/313, 304; 340/853.8; 702/11

(56) References Cited

U.S. PATENT DOCUMENTS

| | | | |
|---|---|---|---|
| 4,809,239 A | * 2/1989 | Esmersoy | 367/57 |
| 4,893,290 A | 1/1990 | McNeel et al. | |
| 6,044,325 A | * 3/2000 | Chakravarthy et al. | 702/7 |
| 6,205,403 B1 | * 3/2001 | Gaiser et al. | 702/14 |
| 6,748,330 B2 | * 6/2004 | Leaney | 702/14 |

FOREIGN PATENT DOCUMENTS

WO   WO 02/073239 A1   9/2002
WO   WO/02073239    *  9/2002 ............ G01V/1/16

OTHER PUBLICATIONS

M. Becquery and M. Dubesset, "Three–component sonde orientation in a deviated well", Geophysics vol. 55, No. 10, pp. 1386–1388.

Horne, S., Slater, C., Malek, S., Hill, A. and Wijnands, F., 2000, "Walkaround VSPs for fractured reservoir characterization", 70th Ann. Internat. Mtg: Soc. of Expl. Geophys., SEG/Calgary 2000 Technical Program Oral Session, 1401–1404.

H.Niitsuma, H. Moriya and K. Nagano, "Calibration method using the spectral matrix for downhhole triaxial selsmic detectors", 5th Conf. on AE/MA, Jun. 1991.

* cited by examiner

Primary Examiner—Thomas H. Tarcza
Assistant Examiner—Scott A. Hughes
(74) Attorney, Agent, or Firm—William L. Wang; Brigitte Echols; Dale Gaudler

(57) ABSTRACT

The invention is a method for determining the orientation of a multi-component receiver where the preferred embodiment of the method makes use of an approximation of the relative bearing angle provided by a relative bearing sensor. The method comprises the steps of scanning various angles around the approximated relative bearing angle provided by the relative bearing sensor and for each scanned angle rotating the data into the true earth frame using a given scanned angle and measuring the polarization angle of the rotated data in the horizontal plane and calculating a weighted sum of the differences between the source azimuth and the estimated azimuth from the polarization.

29 Claims, 6 Drawing Sheets

METHOD OF ESTIMATING RELATIVE BEARING OF A BOREHOLE RECEIVER

BACKGROUND OF INVENTION

1. Field of Invention

This invention relates to a method of estimating the orientation of a receiver and more particularly to a method for estimating the orientation of multi-component seismic receiver deployed in a borehole.

2. Background Art

This subject matter primarily relates to borehole seismic receivers and data such as vertical seismic profiles (VSP) data but may be applied to any data received by directional receivers in a borehole. When using a non-gimbaled multi-component seismic receiver in a borehole, seismic waves are received relative to the orientation of the seismic receiver and measured on a coordinate system specific to the seismic receiver. For example, a three component (3C) seismic receiver measures received seismic waves on three orthonormal axes. Typically, however, it is desirable to interpret the measured seismic data in another coordinate system, such as a true earth frame (northing, easting, vertical). Thus, data received relative to the coordinate system of each non-gimbaled seismic receiver requires rotation to another desired coordinate system for subsequent use.

BRIEF SUMMARY OF INVENTION

In order to perform the appropriate rotation to a preferred coordinate system, the relative bearing of the seismic receiver must be determined. Using this relative bearing, the data received at the individual receivers may be rotated and adjusted prior to combining the seismic data received at various receivers. In addition, repeated measurements of the relative bearing may be used to confirm the vector fidelity of the receiver and the borehole tool, resulting in a confidence level in the dataset that permits refinement of seismic data interpretation. As such, an effective method to determine an accurate estimation of the relative bearing angle is needed.

The present invention comprises a method for determining the orientation of a directional receiver comprising the steps of using a directional receiver deployed in a borehole to receive a seismic wave generated by a source; determining the source azimuth from the source to the borehole; estimating an approximate relative bearing angle; scanning various angles around an approximated relative bearing angle; for each scanned angle, rotating the data into a preferred coordinate system using a given scanned angle, measuring the polarization angle of the rotated data in the horizontal plane, calculating a weighted sum of the differences between the source azimuth and the estimated azimuth from the polarization; and considering the calculated weighted sums for the various angles to select a relative bearing angle.

An embodiment of the method makes use of an approximation of the relative bearing angle provided by a relative bearing sensor. The method comprises the steps of scanning various angles around an approximated relative bearing angle provided by the relative bearing sensor and for each scanned angle, rotating the data into the true earth frame using a given scanned angle, measuring the polarization angle of the rotated data in the horizontal plane, and calculating a weighted sum of the differences between the true source azimuth and the estimated azimuth from the polarization, and considering the calculated weighted sums for the various angles to select a relative bearing angle. In a further embodiment, the weighted sum is then normalized based on the number of source events.

Another embodiment of the present invention uses selected relative bearing angles to estimate the vector fidelity of the borehole tool. The method comprises the steps of scanning various angles around an approximated relative bearing angle provided by the relative bearing sensor and for each scanned angle, rotating the data into the true earth frame using a given scanned angle, measuring the polarization angle of the rotated data in the horizontal plane, calculating a weighted sum of the differences between the true source azimuth and the estimated azimuth from the polarization, and considering the calculated weighted sums for the various angles to select a relative bearing angle. The selected relative bearing is used to orientate data from each receiver to a true earth frame (north, east, vertical). The horizontal polarization angle for each receiver can be compared to the source azimuth in order to estimate the vector fidelity of the seismic receivers or the borehole tool. Another embodiment comprises using the selected relative bearing to process vertical seismic profile data to determine formation properties such as anisotropy or slowness. Other embodiments use the selected relative bearing in geologic modeling or vertical seismic profile survey design.

The invention is particularly applicable to seismic receivers but may be applied as well to other borehole receivers capable of measuring directional motion. The method does not require the use of a shuttle and is not limited to seismic receivers deployed in shuttles. Types of seismic receivers may include any non-gimbaled 3C seismic receiver, including but not limited to geophones, accelerometers, fiber optic geophones, and fiber optic accelerometers. These and other advantageous features of the present invention will be in part apparent and in part pointed out herein below.

BRIEF DESCRIPTION OF THE DRAWINGS

For a better understanding of the present invention, reference may be made to the accompanying drawings in which.

DETAILED DESCRIPTION OF INVENTION

Figure 1:
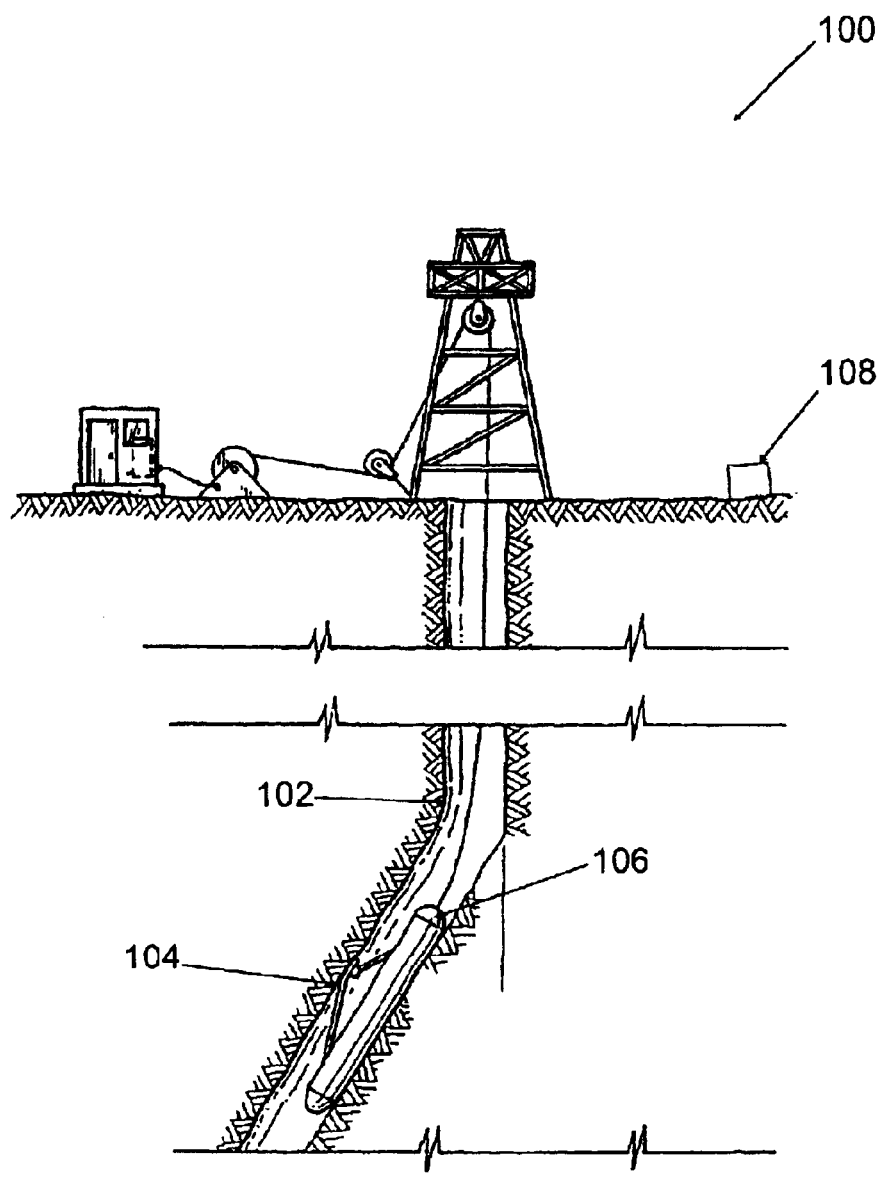
FIG. 1 is a general illustration of a seismic tool deployed in a borehole.

According to the embodiment of the present invention, various views are illustrated in FIGS. 1–6 and like reference numerals are being used consistently throughout to refer to like and corresponding parts of the invention for all of the various views and figures of the drawing.

Referring to FIG. 1, a general illustration is shown of a vertical seismic survey 100 being conducted on a deviated well borehole 102. A seismic source 108 is also shown on the surface for generating a seismic signal to be detected by the downhole borehole seismic tool 106. The seismic source shown is intended to be illustrative of a plurality of seismic generators placed at various azimuths around the borehole. The deviated borehole has a portion 104 that deviates from the vertical at an angle and the borehole seismic tool 106 is shown deployed along the deviated portion 104 of the borehole. The borehole seismic tool is coupled to the wall of the borehole for receiving seismic signals generated from a source 108 on the surface. As shown from this figure the seismic tool with at least one non-gimbaled seismic receiver installed therein is oriented with an angle off vertical. Therefore, the at least one non-gimbaled seismic receiver will be oriented at an angle off vertical, requiring the relative bearing to be determined.

Figure 2:
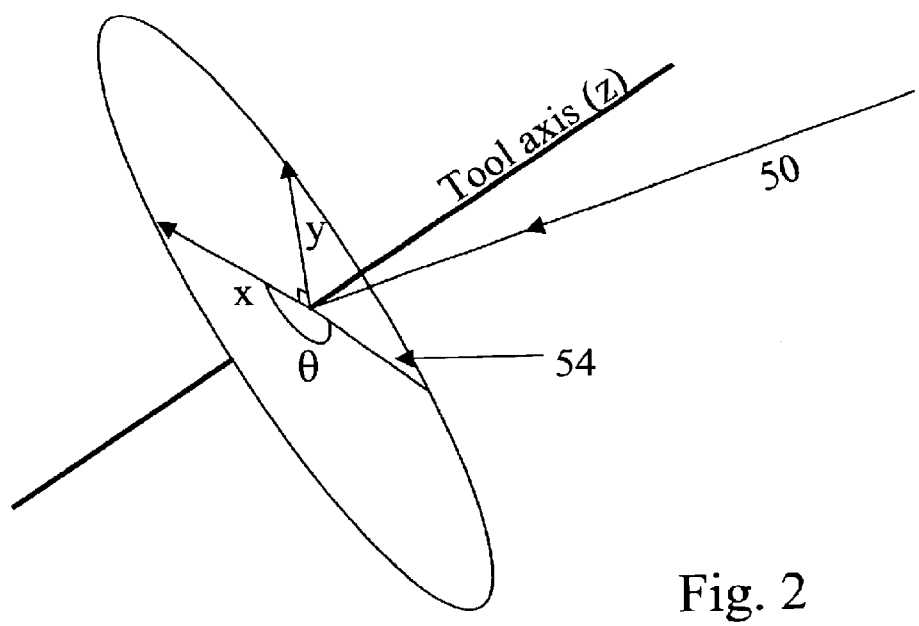
FIG. 2 is a diagram used in a simplified method of estimating relative bearing.

FIG. 2 illustrates a simple method of obtaining relative bearing. This method assumes the direct P-wave arrival 50 follows a straight ray path from the source to the borehole receiver and projects the source-receiver line onto the plane perpendicular to the well containing the X and Y components. This projection 54 is then rotated through the horizontal polarization angle θ gives the direction of the X-component and the relative bearing angle. The basic assumption of this method however is infrequently valid.

Another method, presented by Becquey and Dubesset in their paper entitled "Three-component sonde orientation in a deviated well", *Geophysics*, Vol 55, No. 10 (1990) provides a more refined method. The method is ambiguous in that two possible relative bearings are calculated and determination of which is the correct relative bearing requires additional information or physical considerations. An effective method of determining the relative bearing of a directional sensor in a borehole is needed.

Figure 3:
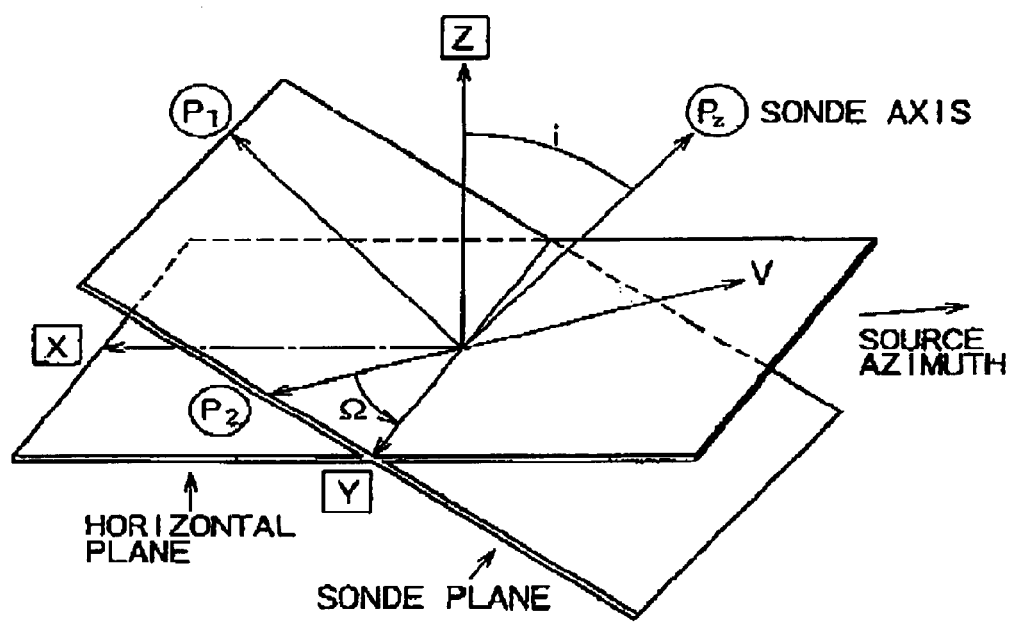
FIG. 3 is a diagram of the coordinate axes and orientation angles representative of the sensor and borehole orientations.

A coordinate system ray diagram is illustrative in describing the geometric relationship between a directional receiver and a well is shown in FIG. 3. The three orthonormal axis of a seismic receiver are $P_1$, $P_2$, and $P_Z$, where $P_Z$ is the axis corresponding to the longitudinal axis of the borehole seismic tool. The seismic receiver plane defined by the $P_1$ and $P_2$ transverse axes is normal to $P_Z$. The preferred coordinate system X, Y, and Z is also shown in FIG. 3, where Z is the vertical axis and the transverse plane defined by X and Y is the horizontal plane. Orientating the seismic ray path V into the preferred X, Y, and Z coordinate system requires rotation of $P_Z$ from the sonde axis to the vertical Z axis and rotation of $P_1$ and $P_2$ in the sonde plane to the horizontal X-Y plane. The Y-axis can be defined as the intersection of 1) the horizontal plane containing X and Y and normal to Z and 2) the seismic receiver plane contains the axes $P_1$ and $P_2$ and normal to $P_Z$. Knowing the deviation of the well, i, permits rotation from the $P_Z$ to the vertical axis Z about the Y-axis. To further rotate to the X-Y plane, however, it is apparent from FIG. 3 that the relative bearing Ω of the tool or receiver plane is needed.

Figure 4:
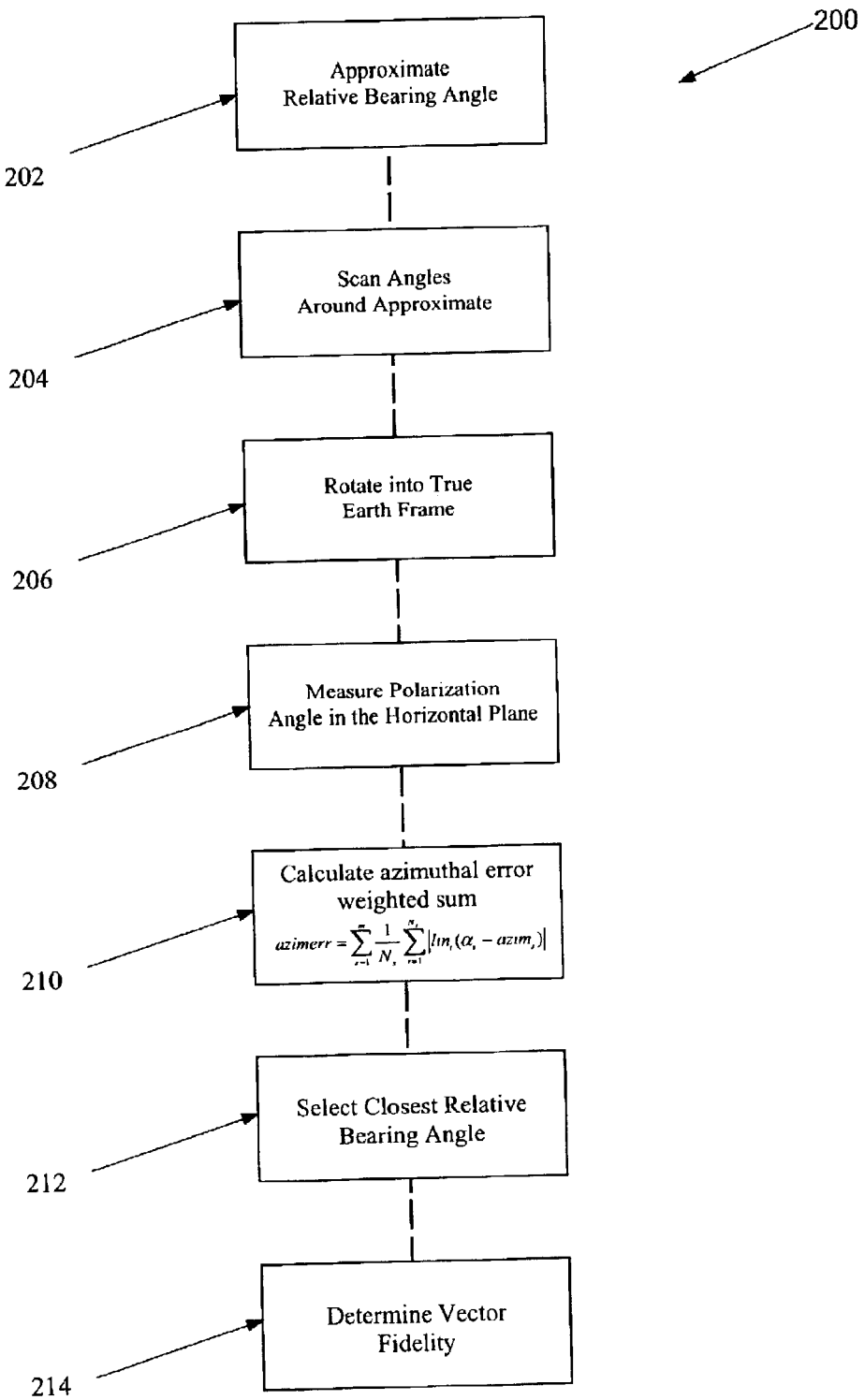
FIG. 4 is a flow diagram.

Referring to FIG. 4 a flow diagram 200 of an embodiment of the method to approximate the relative bearing and estimate vector fidelity is shown. The approximate relative bearing functional step 202 represents the function that performs the step of estimating the relative bearing angle of the borehole receivers. One method of estimating the relative bearing is retrieving an approximated relative bearing angle from a downhole relative bearing sensor. The scanning functional step 204 represents the function that performs the step of scanning angles around the approximate provided by the relative bearing sensor by using known mathematical algorithms which include localized as well as broad area scan methods. The rotate functional block 206 represents the function that performs the step of rotating the data into the earth frame. The polarization functional block 208 represents the function that performs the step of measuring the polarization angle of the direct P-wave in the horizontal plane. The azimuth error functional block 210 represents the function that performs the azimuth error normalized weighted sum calculation as described by the equation. The selection functional block 212 represents the function that performs the step of selecting the closest relative bearing angle resulting from the various azimuth error calculation for each of the scanned angles. The fidelity functional block 214 represents the function that determines vector fidelity based on the relative bearing angle.

One method of the present invention for estimating the relative bearing angle of a non-gimbaled seismic receiver is to utilize a relative bearing sensor in the borehole tool to give an approximate initial value. The downhole sensing tool 106 deployed in borehole 102 has a relative bearing sensor which approximates the orientation of the seismic receiver. Preferably the seismic receiver is a three component (3C) seismic receiver. By using the present method and the approximate initial value provided by the relative bearing sensor, a three axis orientation can be carried out using relative bearings determined on data for each receiver in order to put the data in a true earth frame (north, east, vertical).

One method to determine the relative bearing comprises the steps of:

1) estimating the relative bearing using an approximate angle retrieved from a relative bearing sensor,
2) scanning angles of +/−25° around the estimated relative bearing, and for each scanned angle,
   a) rotating seismic receiver data into the true earth frame (east, north, vertical) using the angle from the relative bearing sensor,
   b) measuring the polarization angle (a) of the rotated data in the horizontal plane.
   c) calculating the azimuth error using a function of the form:

$$azimerr = \sum_{s=1}^{m} \frac{1}{N_s} \sum_{t=1}^{N_s} |lin_t(\alpha_t - azim_s)|.$$

where the function represents the weighted sum ($lin_t$= hodogram linearity) of the differences between the source azimuth ($azim_s$) and the estimated azimuth from the polarization ($a_t$). The summation is performed over all shots (t) for a particular source and then normalized by the number of source events ($N_s$) for that source to give an equal contribution from all m sources;

3) selecting the relative bearing angle closest to the measured relative bearing sensor angle that gives a local minimum azimuth error.

The source azimuth is known from the locations of the source and the borehole. Preferably the direct P-wave arrival is used to measure the polarization angle. The local minimum azimuth error can be determined from a variety of methods, including tabulated results and graphical means. One method comprises compiling a dataset of scanned angles and their associated calculated azimuthal errors and applying a searching algorithm to that dataset to determine the local minimum azimuth error.

Figure 5:
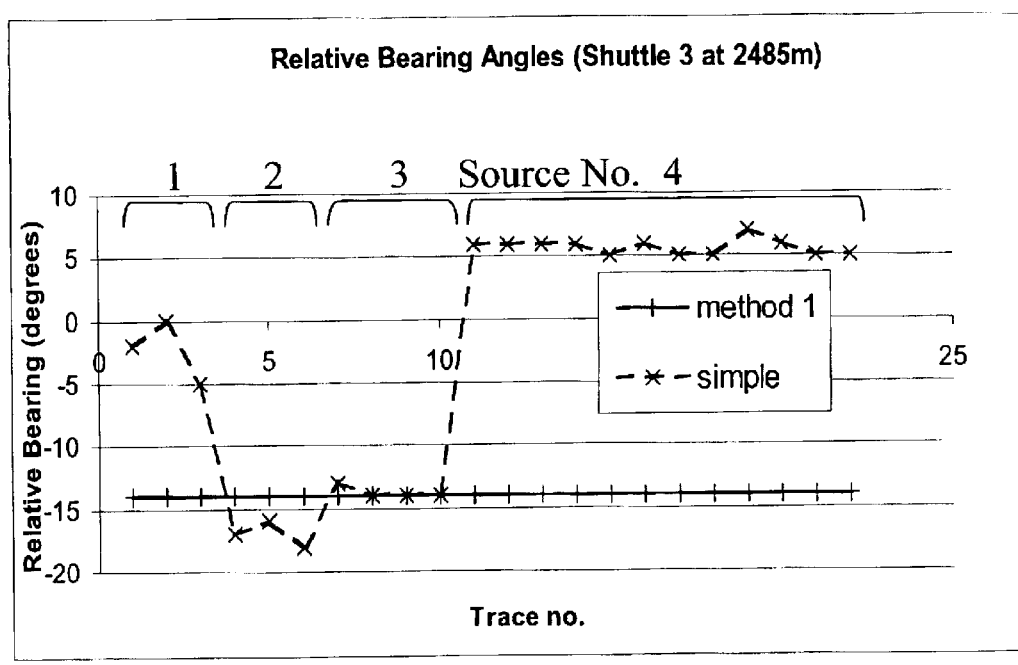
FIG. 5 is a graph of an example for four sources and one receiver.
Figure 6:
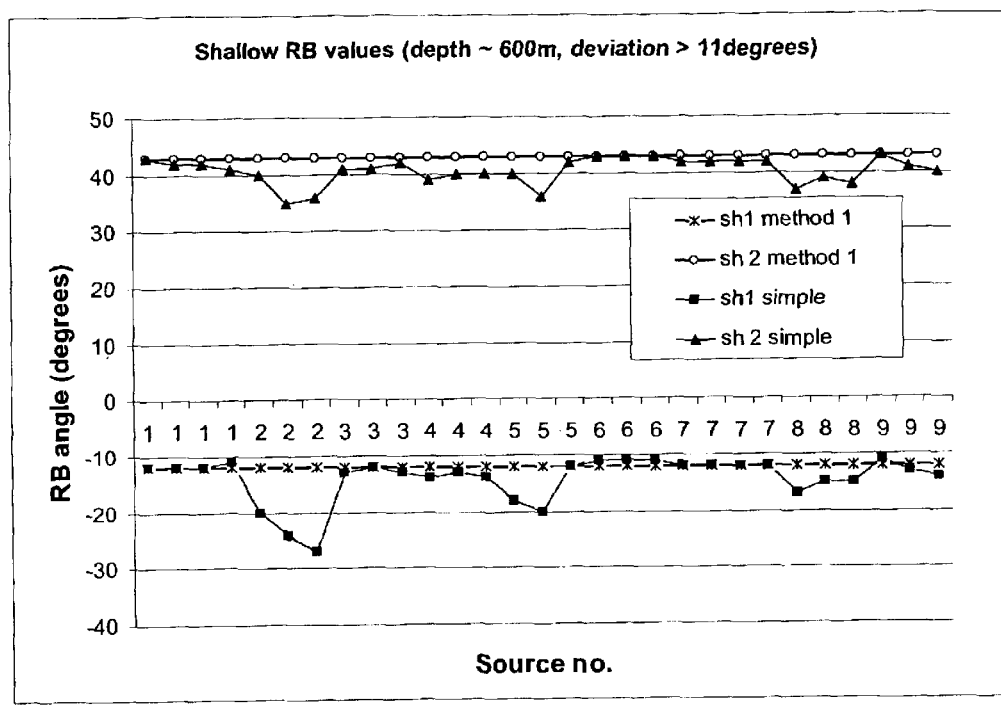
FIG. 6 is a graph of an example for two different receivers.

Comparisons were made between relative bearing of seismic receivers calculated using the present method and those calculated using the simple method shown in FIG. 2 of determining relative bearing of the seismic receivers. FIG. 5 shows an example for a well with deviation of 27°. Across 22 traces, the relative bearing angle for a seismic sensor in Shuttle 3 at 2485 m deep was determined using both the present method and the simple method. Variations in the relative bearing determined by the simple method can be seen across traces corresponding to sources 1, 2 and 3. It is believed these variations are attributable to factors other than receiver orientation, such as geology or poor data quality. If relative bearing calculated using the simple method were used to orientate seismic receivers to another coordinate system, error would be introduced by these variations. Such an introduction of error is avoided by the present method.

A further embodiment comprises using the relative bearing determining by a method of the present invention to determine the vector fidelity of the seismic receivers or the borehole seismic tool. In a second example, an analysis was carried out for receiver shuttles 1 and 2 of a shallow tool located in a cased hole. In this example, the offset/depth ratio for some of the farthest sources (2 and 5) was very large (~6) and the corresponding data amplitudes recorded were extremely low. Results for each receiver shuttle 1 and 2 are shown for both the present method and the simple method in FIG. 6. Two criteria that can be used to determine vector fidelity of the tool are the consistency of results between the different shuttles and the other is the deviation of the polarization azimuth from the true azimuth. Shown in Table 1, the azimuth estimate calculated by the present method was compared to the true source azimuth for this example.

TABLE 1

Shallow cased hole results

| Source | Standard deviation of azimuth estimates | Mean deviation from true azimuth |
|---|---|---|
| 1 | 0.9° | 0.3° |
| 2 | 4.5° | −6.8° |
| 3 | 0.6° | −0.5° |
| 4 | 0.8° | −1.77° |
| 5 | 2.3° | −0.5° |
| 6 | 0.6° | 1.05° |
| 7 | 0.4° | 0.1° |
| 8 | 1.1° | 0.1° |
| 9 | 1.1° | 3.3° |

In terms of the standard deviation of the results from different source events and different receiver shuttles other than the very long offset sources (2 and 5), the deviation is generally less than 1° as shown in Table 1. In this case the agreement with the absolute azimuth is also good, and if Sources 2 and 5 are ignored the average absolute azimuth error for the other seven sources is 1.0°. This comparison is useful in determining the vector fidelity of the seismic receivers. Further this comparison is useful in calibrating data received by the seismic receivers. Such calibration may be receiver-specific, across multiple receivers for the same source events, within a borehole seismic tool, or across a set of seismic data.

Another estimate of vector fidelity comes from the consistency in the azimuth estimates for receiver shuttles with different orientations in the borehole. Overall, for all the sources where VSP data of reasonable quality were obtained, the standard deviation of these measurements was around 1°. It is therefore reasonable to conclude that the absolute vector fidelity of the tool is around +/−2°. The close agreement between the estimated and true source azimuths for the cased hole data shown in Table 1 gives confidence that the estimated relative bearing angles are accurate in this case.

The present methods are useful in the analysis of vertical seismic profile data. Accurate determination of the relative bearing of seismic receivers in the borehole is important in determining formation properties such as anisotropy. The present invention provides a method to determine the relative bearing of the seismic receivers that provides accuracy and confidence needed to evaluate formation properties using vertical seismic profile data. For example, Walkaround VSPs can be used to measure anisotropy for fractured reservoir characterization by using VSP data from several source points arranged azimuthally around seismic receivers deployed in a borehole to determine the anisotropy directions through an examination of the relative amplitudes recorded in the radial and transverse directions. To perform this examination, the data must be rotated into the radial, transverse and vertical coordinate system for each of the source points and events. As the relative amplitudes may vary only slightly, a small error in sensor orientation can significantly effect the anisotropy determination. It can be appreciated that a robust method of orientating seismic receivers, such as the present invention, is preferred.

The present methods also are useful in geologic modeling. The relative bearing of orientation of seismic receivers in a borehole can be used for tasks such as processing vertical seismic profile data, designing a vertical seismic profile survey or generating a synthetic seismic data. An initial relative bearing angle is approximated. If relative bearing sensor information is available, it may be used to approximate an initial relative bearing. Then a present method for determining relative bearing of a seismic receiver in a borehole is applied. This results in a selected relative bearing. The model output, such as vertical seismic profile data, vertical seismic profile survey design, or synthetic seismic data, can then be adjusted based on the selected relative bearing. These steps can be repeated to refine and adjust a geologic model.

One particular application is design of a vertical seismic profile survey configuration that is less sensitive to the relative bearing of seismic sensors in a borehole. This can be accomplished by providing an initial geologic model, providing an initial vertical seismic profile survey configuration, generating synthetic seismic data, selecting a relative bearing using a present method, adjusting the survey configuration to refine the relative bearing, and repeating these steps until a vertical seismic profile survey configuration is achieved that provides a sufficiently refined relative bearing. The type of formation properties to be measured with the vertical seismic profile may influence the degree of refinement in relative bearing necessary.

It is noted that the method of the present invention may be used to orientate any type of seismic data received by a borehole seismic sensor.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention. Other aspects, objects and advantages of the present invention can be obtained from a study of the drawings, the disclosure and the claims.

What is claimed is:

1. A method of determining the relative bearing of a receiver in a borehole comprising the steps of:
    a. using a directional borehole receiver to receive a direct P-wave generated by a source;

b. determining the source azimuth from the source to the borehole;

c. estimating an approximate relative bearing angle of the borehole receiver;

d. scanning at least one angle around the approximate relative bearing angle;

e. rotating for each scanned angle the directional data into the true earth frame creating rotated directional data for each of the scanned angles;

f. measuring for each scanned angle a polarization angle of the rotated data in the horizontal plane;

g. estimating an azimuth from each polarization angle;

h. calculating for all source events the weighted sum of the difference between source azimuth and estimated azimuth, and normalizing by the number of shots to find the azimuth error; and i. selecting a relative bearing angle from the scanned angles.

2. The method of claim 1 wherein step of estimating an approximate relative bearing angle comprises using a downhole relative bearing sensor.

3. The method of claims 1 wherein the relative bearing angle selected from scanned angles is the angle that gives the local minimum azimuth error.

4. The method of claim 1 wherein the step of selecting a relative bearing angle comprises selecting an estimated relative bearing angle from the scanned angles closest to the approximate relative bearing angle that gives the local minimum azimuth error.

5. The method of claim 1 where the receiver is a seismic receiver.

6. The method of claim 1 where the step of selecting a relative bearing angle from the scanned angle further comprises the steps of:

i1) compiling a dataset of scanned angles and calculated azimuthal errors, and i2) applying a searching algorithm to said dataset to determine the local minimum azimuth error.

7. The method as recited in claim 5 further comprising the steps of:

determining vector fidelity of the seismic receiver by calculating the absolute mean deviation of the estimated azimuth from the source azimuth.

8. The method as recited in claim 7 further comprising the steps of:

calibrating data received from the seismic receiver based on the vector fidelity determined.

9. The method as recited in claim 1 further comprising the steps of:

using the selected relative bearing to process vertical seismic profile data.

10. The method as recited in claim 9 further comprising the steps of:

using the processed vertical seismic profile data to determine a formation property.

11. The method as recited in claim 10 wherein the formation property is anisotropy.

12. A method of determining the vector fidelity of a borehole tool comprising multiple seismic receivers comprising the steps of:

a. using more than one directional borehole receiver to receive a direct P-wave generated by a source;

b. determining the source azimuth from source to the borehole;

c. estimating an approximate relative bearing angle for each borehole receiver;

d. scanning at least one angle around each approximate relative bearing angle;

e. rotating for each scanned angle the directional data into the true earth frame, creating rotated directional data for each of the scanned angles;

f. measuring for each scanned angle a polarization angle of the rotated data in the horizontal plane;

g. estimating an azimuth from each polarization angle;

h. calculating for all source events the weighted sum of the difference between source azimuth and estimated azimuth, and normalizing by the number of source events to find the azimuth error;

i. selecting a relative bearing angle from the scanned angles that gives the local minimum azimuth error for each borehole receiver; and j. calculating the standard deviation of the selected relative bearing angles for said borehole receivers.

13. The method of claim 12 where the receiver is a three component seismic receiver.

14. The method of claim 12 where the receiver is a three-component geophone.

15. The method of claim 12 where the receiver is a three-component accelerometer.

16. A method of processing borehole seismic data comprising the steps of:

a. receiving a direct P-wave arrival using multiple seismic receivers in a borehole;

b. determining the source azimuth from source to the borehole;

c. determining the polarization of the direct P-wave arrival for each seismic receiver;

d. calculating the relative bearing angle of each seismic receiver using its determined polarization angle;

e. estimating a source azimuth for each seismic receiver using the calculated relative bearing angle;

f. determining vector fidelity of each seismic receiver by calculating the absolute mean deviation of an estimated source azimuth from the true azimuth based on the relative bearing; and g. calibrating seismic data received based on the determined vector fidelity for each seismic receiver.

17. The method of claim 16, wherein the step of using the polarization angle to calculate the relative bearing angle of each seismic receiver comprises:

estimating an approximate relative bearing angle of the borehole receiver;

scanning at least one angle around the approximate relative bearing angle;

rotating for each scanned angle the directional data into the true earth frame creating rotated directional data for each of the scanned angles; and measuring for each scanned angle a polarization angle of the rotated data in the horizontal plane.

18. The method as recited in claim 16 where the seismic receiver is a three component seismic receiver.

19. The method as recited in claim 16 further comprising the steps of:

using the calibrated vertical seismic profile data to determine a formation property.

20. The method as recited in claim 19 wherein the formation property is anisotropy.

21. A method for generating a geological model using the relative bearing of a seismic receiver comprising the steps of:

a. defining a geological model using a vertical seismic profile configuration, said configuration having an initial source and borehole receiver geometry defined;
b. generating synthetic seismic data using synthetic source events;
c. approximating a relative bearing angle of a borehole seismic receiver in said defined geologic model;
d. scanning at least one angle around the approximate relative bearing angle;
e. rotating for each scanned angle the synthetic data into the true earth frame, creating rotated synthetic data for each of the scanned angles;
f. measuring for each scanned angle a polarization angle of the rotated synthetic data in the horizontal plane;
g. calculating for all source events the weighted sum of the difference between source azimuth and estimated azimuth, and normalizing by the number of source events to find the azimuth error;
h. selecting an estimated relative bearing angle from the scanned angles closest to the measured relative bearing sensor angle that gives the local minimum azimuth error; and
i. adjusting the model from the initial geometry to a new geometry based on the estimated relative bearing.

22. The method as recited in claim 21 further comprising the step of:
j. determining a formation property using the adjusted model.

23. The method as recited in claim 22 further comprising the step of:
k. determining the sensitivity of a formation property determination to relative bearing by repeating steps a through j and comparing the results.

24. A method for processing vertical seismic profile data comprising:
a. receiving seismic data generated by multiple source events using multiple seismic receivers in a borehole;
b. determining a source azimuth for each said source event;
c. receiving an approximate relative bearing angle from a relative bearing sensor of a downhole seismic receiver;
d. scanning at least one angle around the approximate relative bearing angle;
e. rotating for each scanned angle the seismic data into the true earth frame, creating rotated seismic data for each of the scanned angles;
f. measuring for each scanned angle a polarization angle of the rotated seismic data in the horizontal plane;
g. calculating for all source events the weighted sum of the difference between source azimuth and estimated azimuth, and normalizing by the number of source events to find the azimuth error;
h. selecting an estimated relative bearing angle from the scanned angles that is the closest to the measured relative bearing sensor angle that gives the local minimum azimuth error; and
i. adjusting the received seismic data using the selected relative bearing angle for each seismic receiver.

25. The method as recited in claim 24 further comprising the steps of using the adjusted vertical seismic profile data to determine a formation property.

26. The method as recited in claim 25, wherein the formation property is anisotropy.

27. The method as recited in claim 24, wherein the seismic receivers are three-component seismic receivers.

28. A method for designing a vertical seismic profile survey configuration comprising:
a. defining a geological model having at least one initial source location and at least one borehole receiver location;
b. approximating a relative bearing angle of a downhole seismic receiver;
c. generating synthetic seismic data for the geologic model using synthetic source events;
d. processing said synthetic seismic data to select a relative bearing angle; and
e. adjusting said vertical seismic profile survey configuration using the selected relative bearing angle.

29. The method of claim 28 wherein the processing step comprises:
d1. scanning at least one angle around the approximate relative bearing angle;
d2. rotating for each scanned angle the synthetic data into the true earth frame creating rotated synthetic data for each of the scanned angles;
d3. measuring for each scanned angle a polarization angle of the rotated data in the horizontal plane;
d4. calculating for all source events the weighted sum of the difference between source azimuth and estimated azimuth, and normalizing by the number of source events to find the azimuth error;
d5. selecting an estimated relative bearing angle from the scanned angles closest to the measured relative bearing sensor angle that gives the local minimum azimuth error.

* * * * *